US010791298B2

United States Patent
Rutler (10) Patent No.: US 10,791,298 B2
(45) Date of Patent: Sep. 29, 2020

(54) CONTROLLING ELEMENT PRESENCE IN A VIDEO RENDERING

(71) Applicant: Interactive Media, LLC, Olathe, KS (US)

(72) Inventor: Jay Rutler, Overland Park, KS (US)

(73) Assignee: Interactive Media, LLC, Olathe, KS (US)

( * ) Notice: Subject to any disclaimer, the term of this patent is extended or adjusted under 35 U.S.C. 154(b) by 0 days.

(21) Appl. No.: 16/109,253

(22) Filed: Aug. 22, 2018

(65) Prior Publication Data

US 2019/0068911 A1    Feb. 28, 2019

(51) Int. Cl.
| | |
|---|---|
| H04N 5/45 | (2011.01) |
| H04N 5/445 | (2011.01) |
| H04N 5/08 | (2006.01) |
| H04N 5/278 | (2006.01) |
| H04N 5/265 | (2006.01) |

(52) U.S. Cl.
CPC ............. *H04N 5/45* (2013.01); *H04N 5/08* (2013.01); *H04N 5/265* (2013.01); *H04N 5/278* (2013.01); *H04N 5/44591* (2013.01); *H04N 2005/44595* (2013.01)

(58) Field of Classification Search
CPC ........ H04N 5/45; H04N 5/08; H04N 5/44591; H04N 2005/44595
See application file for complete search history.

(56) References Cited

U.S. PATENT DOCUMENTS

| | | | |
|---|---|---|---|
| 5,767,897 A | | 6/1998 | Howell |
| 5,929,927 A | * | 7/1999 | Rumreich ............. G09G 5/343 348/563 |
| 7,356,763 B2 | | 4/2008 | Lin et al. |
| 8,442,264 B2 | | 5/2013 | Rhoads et al. |
| 9,153,288 B2 | | 10/2015 | Yin |
| 9,578,287 B2 | | 2/2017 | Tong et al. |
| 2004/0179816 A1 | * | 9/2004 | Takehana ............. G11B 27/032 386/281 |
| 2009/0123128 A1 | * | 5/2009 | Shimada ................ G11B 20/10 386/334 |

(Continued)

OTHER PUBLICATIONS

Sadik, Alaa, "The Development and Evaluation of a Network for Producing and Sharing Video Presentations," I-Manager's Journal of Educational Technology, vol. 11, No. 2, Jul.-Sep. 2014, pp. 28-40.

(Continued)

*Primary Examiner* — Michael E Teitelbaum
(74) *Attorney, Agent, or Firm* — Husch Blackwell, LLP (57) ABSTRACT

Systems and methods enable rendering picture-in-picture ("PIP") video outputs and re-rendering of the rendered video file to remove particular excluded video elements and/or add selectively included elements independently from other video elements. Input video data is analyzed for the presence of presentation elements and the portions of the video including the presentation element are tracked in an event log. A PIP output video is rendered that includes the presentation element. Upon receiving a command to exclude the presentation element, the portions of the PIP output video containing the presentation element are re-rendered to remove the presentation element from the PIP output video.

19 Claims, 8 Drawing Sheets

(56) References Cited

U.S. PATENT DOCUMENTS

| | | | |
|---|---|---|---|
| 2009/0256901 A1* | 10/2009 | Mauchly | H04N 5/45 348/14.07 |
| 2011/0109808 A1* | 5/2011 | Li | H04N 5/45 348/725 |
| 2012/0300080 A1 | 11/2012 | Batson | |
| 2013/0198642 A1 | 8/2013 | Carney et al. | |
| 2014/0325393 A1 | 10/2014 | Quinn et al. | |
| 2017/0157512 A1 | 6/2017 | Long et al. | |
| 2017/0339447 A1 | 11/2017 | Brand | |
| 2018/0068689 A1 | 3/2018 | Davis, III et al. | |

OTHER PUBLICATIONS

Information technology—Generic coding of moving pictures and associated audio information: Systems; ISO/IEC 13818-1:2000(E).

* cited by examiner

CONTROLLING ELEMENT PRESENCE IN A VIDEO RENDERING

CROSS-REFERENCE TO RELATED APPLICATIONS

This application claims priority to U.S. Provisional Application Ser. No. 62/549,715, filed Aug. 24, 2017, the entire disclosure of which is incorporated herein by reference.

FIELD OF INVENTION

The present disclosure relates generally to systems and methods for controlling the presence of elements in a video rendering, and more particularly to systems and methods for rendering picture-in-picture video outputs and re-rendering the video to remove particular excluded elements and/or add selectively included elements independently from other elements.

BACKGROUND OF INVENTION

It is common practice to use presentations as a form of information exchange. Often, during a presentation, the presenter will use a screen to display videos, documents, pictures or other media to help illustrate the point of the presentation. Many prior art presentation products exist, and provide tools to the presenter to get the point across clearly to the audience. However, these presentation systems do not anticipate the secondary audience who will be watching through video.

Presentations are often videoed for use in live streaming, or as a visual (and audio) record of the event. Typically, these are captured by a third-party system designed to record and mix video intended to be recorded or broadcast. Often these video productions take the form of Picture-in-Picture ("PIP") video, where video frames are overlaid to give the full picture of the event.

Current methods for constructing PIP videos are time consuming, require expert video editors, and do not allow the untrained end user to actively decide the outcome. Moreover, current methods for constructing PIP videos are unable to accommodate quickly and confidently removing certain elements from a previously rendered PIP video while not disturbing other elements at the same frame/time location in the video. For example, known methods for removing a document from an existing video rendering require a human user to manually review every frame of the video to identify documents that need to be excluded. These methods are time-consuming and prone to error.

SUMMARY OF THE INVENTION

Systems and methods enable rendering PIP video outputs and re-rendering of the rendered video file to remove particular excluded video elements and/or add selectively included video elements independently from other video elements.

In an aspect, systems and methods include analyzing input video data for a presentation element signal. The input video data includes a video recording of a subject and the presence of the presentation element signal indicates the presence of a presentation element in the input video data. The presence of the presentation element in the input video data comprises a presentation event and the presentation element signal includes an identifier uniquely identifying the presentation element. The systems and methods further include generating a record for the presentation event in an event log in response to the presence of the presentation element signal in the video data. The record includes the identifier and a start time of the presentation event in the video data. The input video data is analyzed for the absence of the presentation element signal, which indicates the absence of the presentation element from the input video data. In response to the absence of the presentation element signal in the video data, an end time of the presentation event is logged in the event log record for the presentation event. The systems and methods also include rendering a PIP output video from the input video data. The PIP output video includes a full-screen portion and an inset window portion. The presentation element comprises the full-screen portion during the presentation event and the video recording of the subject comprises the inset window portion during the presentation event. A command, which includes the identifier of the presentation element, to exclude the presentation element from the PIP output video is received. In response to receiving the command, the start time and end time of the associated presentation event is retrieved from the event log. The PIP output video is re-rendered at the portion between the retrieved start time and end time of the presentation event. The re-rendering excludes the inset window portion and moves the video recording of the subject to the full-screen portion during the presentation event. Accordingly, the presentation element is removed from the PIP output video during the presentation event.

DETAILED DESCRIPTION OF THE INVENTION

Figure 1:
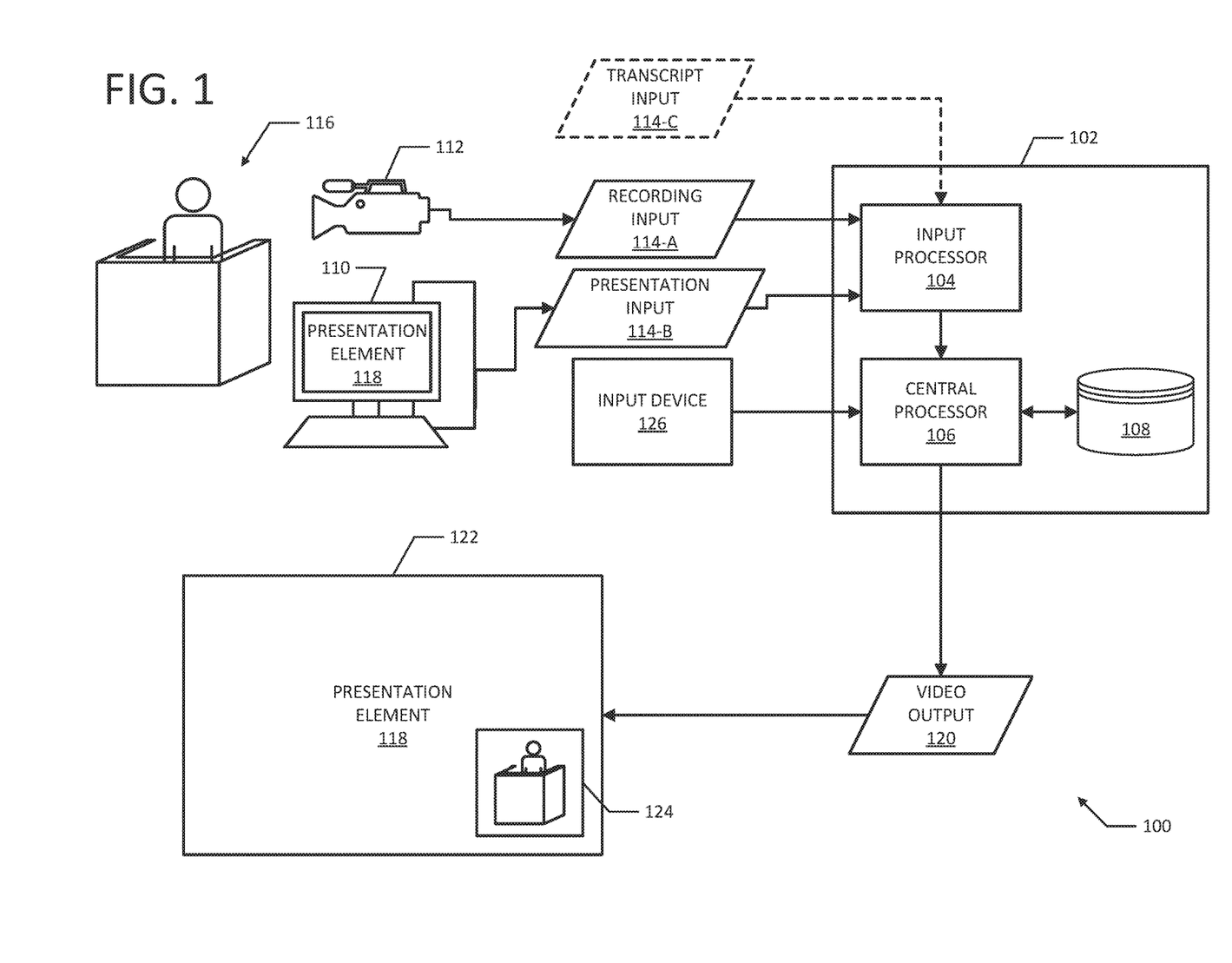
FIG. 1 is a block diagram of a system hereof, according to an example embodiment.

Referring to the drawings more particularly by reference numbers wherein like members refer to like parts, FIG. 1 illustrates a block diagram of an example system 100. As can be seen, system 100 includes a video controller 102, which in turn includes an input processor 104, a central processor 106, and a database 108. The video controller 102 is in communication with a presentation device 110 and a recording device 112. Such communication may be locally hardwired, or may remote. Presentation device 110 and recording device 112 may upload their generated data (e.g., "feeds") as input data 114 via the Internet, or otherwise. In an embodiment, recording device 112 and presentation device 110 may upload their data as independent input data streams 114-A and 114-B, respectively. In an alternative embodiment, recording device 112 and presentation device 110 may upload their data as a single input stream 114.

In general usage, the recording device 112, which may be a video camera or the like, records a subject 116, and provides its video feed to the input processor 104 and the central processor 106. At times, during the recording of the subject 116, the presentation device 110 may be used to display a presentation element 118 (e.g., materials, exhibits, slides, images, documents, etc.) live, such as via a display device and/or a projector (not shown). When presentation device 110 is used to display the presentation element 118, an output of the presentation element 118 is also provided to the input processor 104 for combination with the recording input from recording device 112. In an embodiment, the output of the presentation device 110 and the video feed from recording device 112 are captured in synchronization, such that duration and events substantially coincide. The inputs from both presentation device 110 and recording device 112 are captured for the entire duration of the event, despite the possibility of long periods in the input from the presentation device 110 in which there may not be any content.

Once the feeds from presentation device 110 and recording device 112 have been captured, central processor 106 can then generate a video output 120 (e.g., a video data file, etc.) from the combined input streams 114, as further described herein. Central processor 106 can further receive commands from an input device 126 and re-generate the video output 120, in full or in part, to carry out the commands, as further described herein. The video output 120 may include any display configuration capable of displaying at least two feeds or streams of video data. In an embodiment, the video output 120 is a PIP video stream that includes a full-screen portion 122 and an inset window portion 124. In an alternative embodiment, the video output 120 is a PIP video stream that includes a side-by-side display in which a plurality of videos may all be substantially similar in size or one video may be a dominant size. Optionally, a transcript of the recording of the subject 116 can be provided to input processor 104 and central processor 106 as a transcript input 114-C for inclusion in the video output 120.

Figure 2:
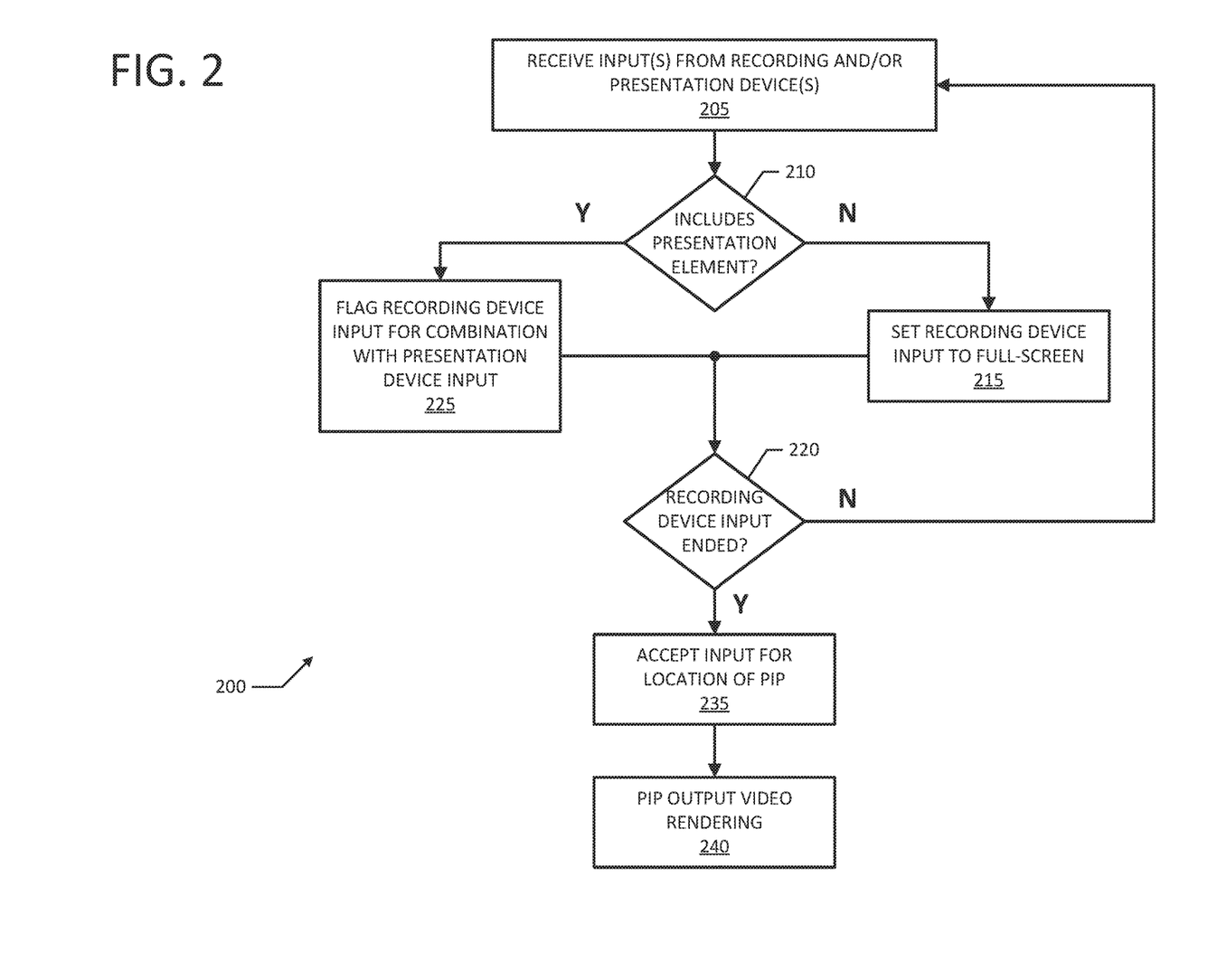
FIG. 2 is a flow chart of a method hereof, according to an example embodiment.

FIG. 2 illustrates a flow chart of an example method 200 for creating a PIP composite video rendering. At step 205, the system 100 begins recording video via recording device 112. The input data 114 is transmitted to the input processor 104, which combines the inputs and provides them to the central processor 106. In an embodiment, the inputs are stored as separate source files before combination by the input processor 104. At step 210, a determination is made as to whether the presentation element 118 is being displayed via the presentation device 110. This determination may occur by monitoring the output from the presentation device 110, and determining if the screen is black. Specific shades of black may be used as a trigger for this determination. Alternatively, cues or flags may be placed in the presentation element 118 in advance, such that the system can detect the cues as a signal that the presentation device 110 is in use. Where such signals have not been detected, the system 100 may determine that the presentation device 110 is not in use. Other techniques may also be used, as would be known in the art.

Where nothing is being shown on the presentation device 110 at step 210, the system progresses to step 215 where the video feed from recording device 112 is set to full screen. At step 220, the system 100 determines whether the video stream has ended. Where it has not ended, the system reverts to step 205. Where it has ended, the system 100 progresses to step 235, which will be discussed in detail below.

When the system 100 determines the presentation device 110 is actively outputting the presentation element 118 at step 210, the system advances to step 225 where the video feed from recording device 112 is flagged for PIP. Such flagging may be accomplished by simply recording a timestamp of the video at the point at which the presentation device 110 became active. The timestamp may also include a reference back to the presentation output from the presentation device 110 to associate the timestamp with the appropriate part of the presentation.

Alternatively, the video feed may actually be edited to include a visual or metadata flag at the point at which the presentation device 110 became active. In any case, at step 220, the system 100 determines whether the video stream has ended. Where it has not ended, the system reverts to step 205. Where it has ended, the system 100 progresses to step 235, where the system accepts inputs for the location of the PIP. This may be selected in advance by the presenter or another user by including flags in the presentation. For example, top right, top left, bottom right, and bottom left may be used. Alternatively, the system 100 may prompt the presenter/user. Relative sizing of the PIP may also be selected at this step in the same manner as above. Finally, at step 240, the full PIP video output 120 is rendered, combining the video feed and the presentation feed as instructed.

The rendering process may also occur in post-production, with a video feed and presentation feed that were previously recorded. In such cases, the system may analyze the presentation feed for content, such as by monitoring for a predominantly black screen or the like. Alternatively, as noted above, embedded metadata or specific symbols may be added into the stream for this purpose. PIP mapping and timecoding of PIP events may then be created. In a non-limiting example embodiment, an xml filed may be used. Full and/or lightweight versions of the presentation and video streams may then be created, along with a timecoded transcript file in some embodiments.

The system may then overlay a video window to create a PIP effect without physically combining the video streams. The user may select a portion or all of the video to be rendered, and may make changes to the PIP as desire (e.g., size, location, etc.). The user may also select one or more portions of the video for redaction, if desired, and initiates rendering of the full PIP video into a single video file.

Figure 3A:
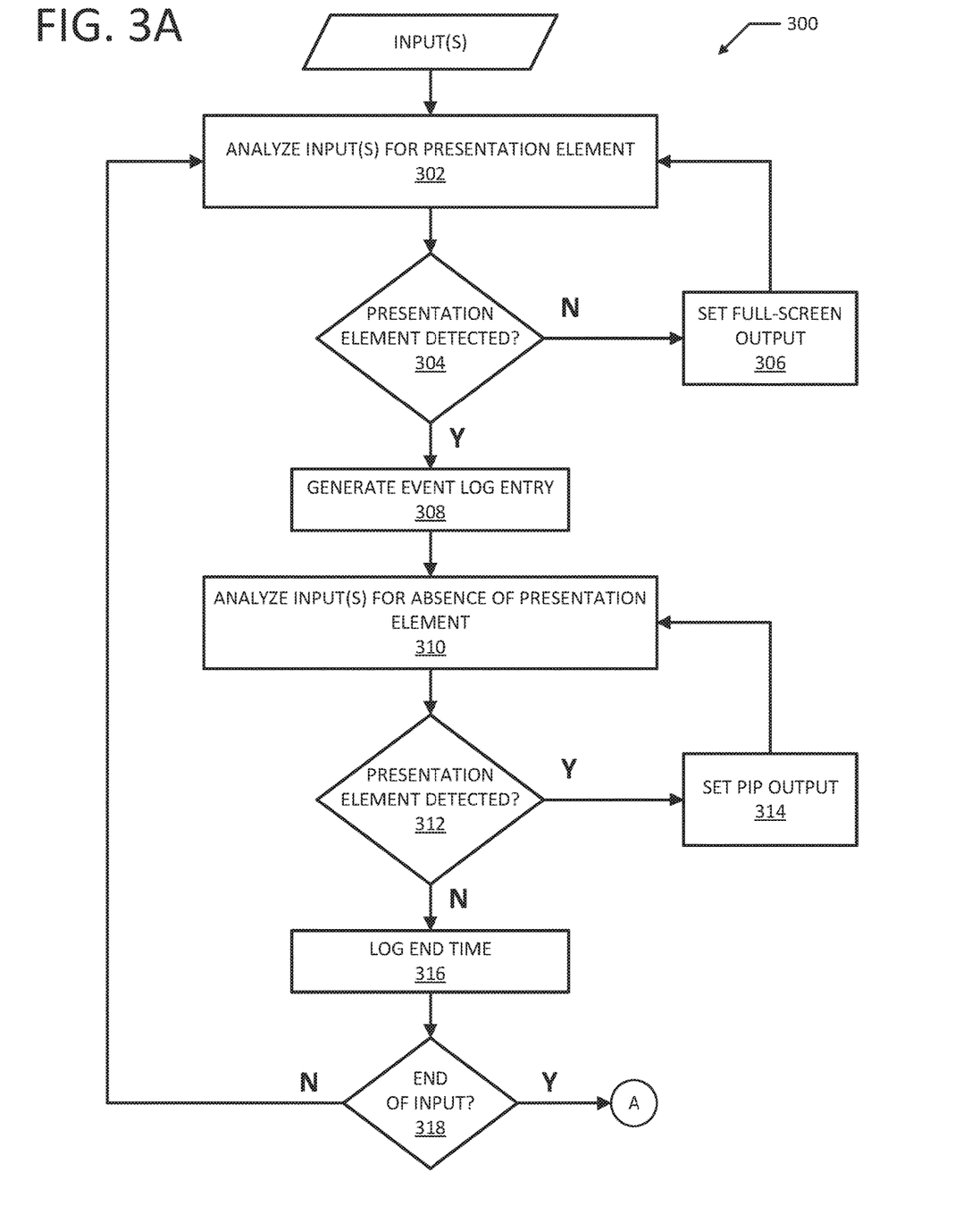
FIGS. 3A and 3B are a flow chart of another method hereof, according to an example embodiment.
Figure 3B:
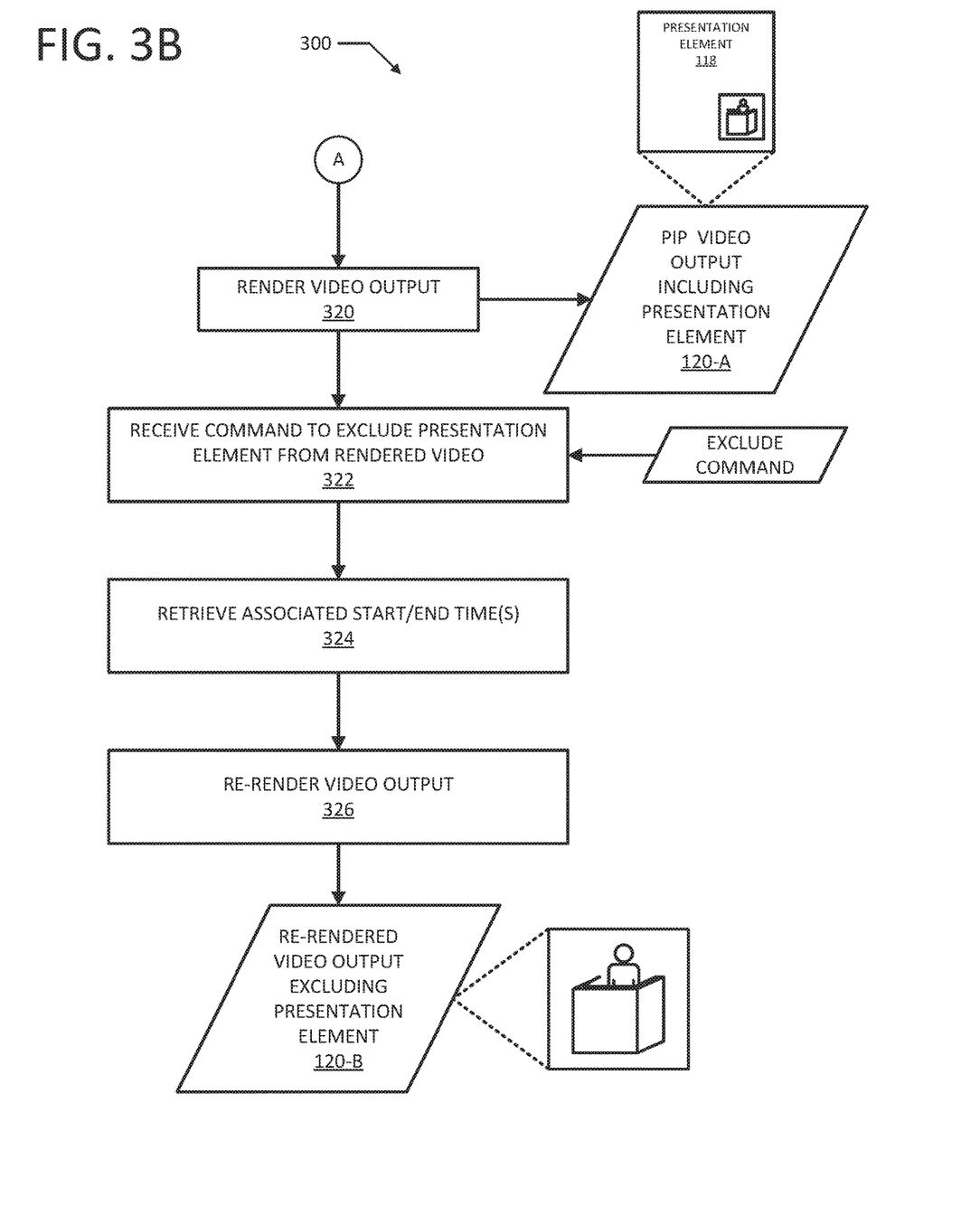

FIGS. 3A and 3B illustrate a flowchart of an example method 300 for re-rendering a video to remove particular excluded elements independently from other elements. Referring further to FIG. 3A, at 302 received input data is analyzed for the presence of the presentation element 118. As explained above, this analysis can include determining if the display of presentation device 110 is black or other specific shades and/or analyzing for cues or flags placed in the presentation element 118. In an embodiment, only presentation input 114-B may be analyzed. In an alternative embodiment, a combined data input stream that includes the presentation input 114-B and one or more other data inputs may be analyzed.

At step 304, a determination is made as to whether the presentation element 118 is detected in the input data. Upon determining that the presentation element 118 is not detected in the input data, the system 100 progresses to step 306 where the video feed from the recording device 112 is set to full screen. In an aspect, by setting these portions of the video in which the presentation element 118 is not detected to full screen, the video recording of the subject comprises the full-screen portion of the PIP output video outside of the presentation event. The system 100 then reverts to step 302.

When the system 100 determines that the presentation element 118 is detected in the input data stream, the system advances to step 308 where an event log entry for the presentation element is generated. The event log may be stored in the database 108 and include a record (e.g., a row) for each presentation element 118 detected in the input data stream. The event log may also include one or more fields (e.g., columns), including a field for an identifier of the presentation element, a field for a start time of the presentation element, and a field for an end time of the presentation element. The identifier of the presentation element may uniquely identify the presentation element from other presentation elements. For example, the identifier may be a document number and may be included in a visible or invisible manner on the presentation element 118 and detectable by central processor 106 for automatic determination of the identifier. The start time may be a timestamp, or video frame count, of the time (e.g., the elapsed time of the input data stream and/or the video feed from recording device 112, etc.) when the presentation element becomes present in the input data stream. The end time may be a timestamp, or video frame count, of the time (e.g., the elapsed time of the input data stream and/or the video feed from recording device 112, etc.) when the presentation element next becomes absent in the input data stream. In an example aspect, the presentation element records may be used to search for every incidence of a certain document element across one or more recordings. In another example aspect, the presentation element records may be cross-referenced with a transcript (e.g., transcript input 114-C) so that even a viewer of only the transcript can access the relevant presentation element, such as via a hyperlink or the like. A start time (e.g., timestamp, video frame count, etc.) for the detected presentation element 118 is logged in the event log entry for the presentation element at step 308.

At step 310, the central processor 106 analyzes received input data for the next absence of the presentation element 118. As explained above, this analysis can include determining if the display of presentation device 110 is black or other specific shades and/or analyzing for cues or flags placed in the presentation element 118. In an embodiment, the central processor 106 may analyze only presentation input 114-B. In an alternative embodiment, the central processor 106 may analyze a combined data input stream that includes the presentation input 114-B and one or more other data inputs.

At step 312, a determination is made as to whether the presentation element 118 is detected in the input data. Upon determining that the presentation element 118 is still detected in the input data, the system 100 progresses to step 314 where the video feed from the recording device 112 is set to PIP. The system 100 then reverts to step 310. When the system 100 determines at step 312 that the presentation element 118 is not detected in the input data stream, the system advances to step 316, where an end time (e.g., timestamp) for the now-absent presentation element 118 is logged in the event log entry for the presentation element. In an embodiment, an elapsed time between the start time and the end time of the presentation element 118 comprises a presentation event. A single presentation element 118 may comprise one or more presentation events that occur within the input data. In a non-limiting example embodiment, a particular presentation element 118 may be displayed on the presentation device 110 from 00:15:00 to 00:25:30 (e.g., a first presentation event of the presentation element) during testimony by the recorded subject 116 and then again from 01:40:30 to 02:05:00 (e.g., a second presentation event of the presentation element).

At step 318, a determination is made as to whether the data input has ended. Where it has not ended, the system 100 reverts to step 302. Where it has ended, the system 100 progresses to step 320.

Referring further to FIG. 3B, the video output 120-A is rendered at step 320. This rendered video output 120-A includes, at least in part, a PIP video stream that includes a full-screen portion 122 and an inset window portion 124. As explained further herein, during portions of the video output 120-A in which the presentation element 118 is present, the presentation element captured from the presentation device 110 comprises the full-screen portion 122 and the video captured by recording device 112 comprises the inset window portion 124. Further, during portions of the video output 120-A in which the presentation element 118 is absent, the video captured by recording device 112 comprises the full-screen portion 122 and the inset window portion 124 is not included. The rendering operation may include, but is not limited to, generating a video file to be stored on non-transitory computer-readable media (e.g., a digital optical disc, computer data storage, etc.), generating a video file to be streamed over a telecommunications network (e.g., the Internet, etc.) to end user devices (e.g., desktop computers, tablet computing devices, smartphones, etc.), and combinations thereof. In an alternative embodiment, the rendering operation may include preparing the video output for display without generating a video file. For example, the rendering operation may include generating signals for communicating the video output to a display device via an interconnect (e.g., HDMI, DisplayPort, Digital Visual Interface (DVI), serial digital interface (SDI), etc.).

At step 322, a command is received to exclude, at least in part, the presentation element 118 from the rendered video output 120-A. In an embodiment, the received command includes the identifier of the presentation element 118. In response to receiving the command to exclude, all of the start times and end times associated with the presentation element 118 are retrieved from the database 108 at step 324. At step 326, the portions of the video output 120-A between the retrieved start times and end times are re-rendered into video output 120-B. In an example embodiment, the re-rendering is performed in response to retrieving the start times and end times (e.g., automatically). In another example embodiment, the re-rendering is performed after user acknowledgement/verification (e.g., of the retrieved start and end times, etc.). The re-rendering operation may include, but is not limited to, generating a video file to be stored on non-transitory computer-readable media (e.g., a digital optical disc, computer data storage, etc.), generating a video file to be streamed over a telecommunications network (e.g., the Internet, etc.) to end user devices (e.g., desktop computers, tablet computing devices, smartphones, etc.), and combinations thereof. In an alternative embodiment, the re-rendering operation may include preparing the video output for display without generating a video file. For example, the re-rendering operation may include generating signals for communicating the video output to a display device via an interconnect (e.g., HDMI, DisplayPort, Digital Visual Interface (DVI), serial digital interface (SDI), etc.)

The re-rendered portions of the video output 120-B exclude the inset window portion 124 and the video captured by recording device 112 comprises the full-screen portion 122. In this manner, the presentation element 118 is removed from the re-rendered video output 120-B. Those skilled in the art will understand that redacting one or more portions of the presentation element 118 and continuing to present the redacted presentation element in the full-screen portion 122 and the video captured by recording device 112 in the inset window portion 124 is also within the scope of the inventive subject matter. Example reactions include, but are not limited to, blurring, blocking (e.g., with a black bar), and the like.

Figure 4:
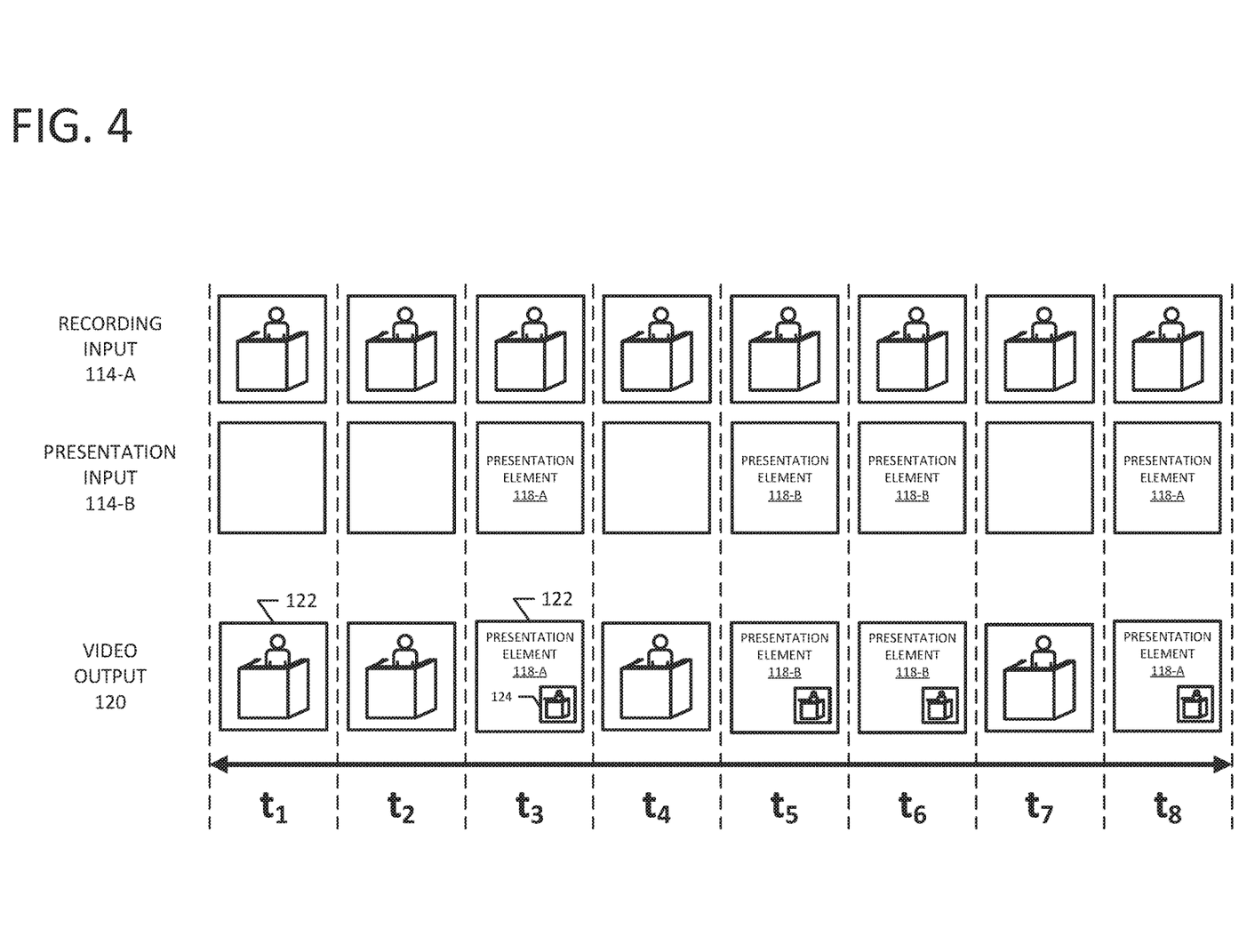
FIG. 4 is a diagram of visual representations of data inputs and outputs of the systems and methods hereof, according to an example embodiment.

FIG. 4 illustrates a non-limiting example embodiment of data inputs and the corresponding video output in accordance with the described systems and methods. As illustrated, the recording input 114-A includes a video feed captured by recording device 112 at times $t_1$ and $t_2$. At times $t_1$ and $t_2$, no presentation element is presented by the presentation device 110. The video output 120 for times $t_1$ and $t_2$ thus includes the video feed from the recording device 112 at times $t_1$ and $t_2$ set to full screen and comprising the full-screen portion 122.

At time $t_3$, a presentation element 118-A is presented by the presentation device 110. Thus, the video output 120 for time $t_3$ includes the presentation element 118-A comprising the full-screen portion 122 and the video feed from the recording device 112 at time $t_3$ comprising the inset window portion 124.

At time $t_4$, no presentation element is presented by the presentation device 110. The video output 120 for time $t_4$ thus includes the video feed from the recording device 112 at time $t_4$ set to full screen and comprising the full-screen portion 122.

At times $t_5$ and $t_6$, a presentation element 118-B is presented by the presentation device 110. Thus, the video output 120 for times $t_5$ and $t_6$ includes the presentation element 118-B comprising the full-screen portion 122 and the video feed from the recording device 112 at times $t_5$ and $t_6$ comprising the inset window portion 124.

At time $t_7$, no presentation element is presented by the presentation device 110. The video output 120 for time $t_7$ thus includes the video feed from the recording device 112 at time $t_7$ set to full screen and comprising the full-screen portion 122.

At time $t_8$, the presentation element 118-A is again presented by the presentation device 110. Thus, the video output 120 for time $t_8$ includes the presentation element 118-A comprising the full-screen portion 122 and the video feed from the recording device 112 at time $t_8$ comprising the inset window portion 124. In an embodiment, the presentation of presentation element 118-A by the presentation device 110 at time $t_3$ comprises a first presentation event and the presentation of presentation element 118-A by the presentation device 110 at time $t_8$ comprises a second presentation event. In a non-limiting example embodiment, a command to exclude the presentation element 118-A would cause the system 100 to re-render the video output 120 to exclude the inset window portion 124 and make the video captured by recording device 112 at times $t_3$ and $t_8$ comprise the full-screen portion 122. In this manner, the presentation element 118-A is removed from the re-rendered video output 120. Although illustrated and described as discrete times for simplification, those skilled in the art will understand that times $t_1$-$t_8$ may be periods of time. Further, although embodiments illustrated and described herein include the presentation element 118 comprising the full-screen portion 122 and the video feed from the recording device 112 comprising the inset window portion 124, those skilled in the art will understand that the video feed from the recording device 112 may comprise the full-screen portion 122 and the presentation element 118 may comprise the inset window portion 124 in alternative embodiments.

Figure 5:
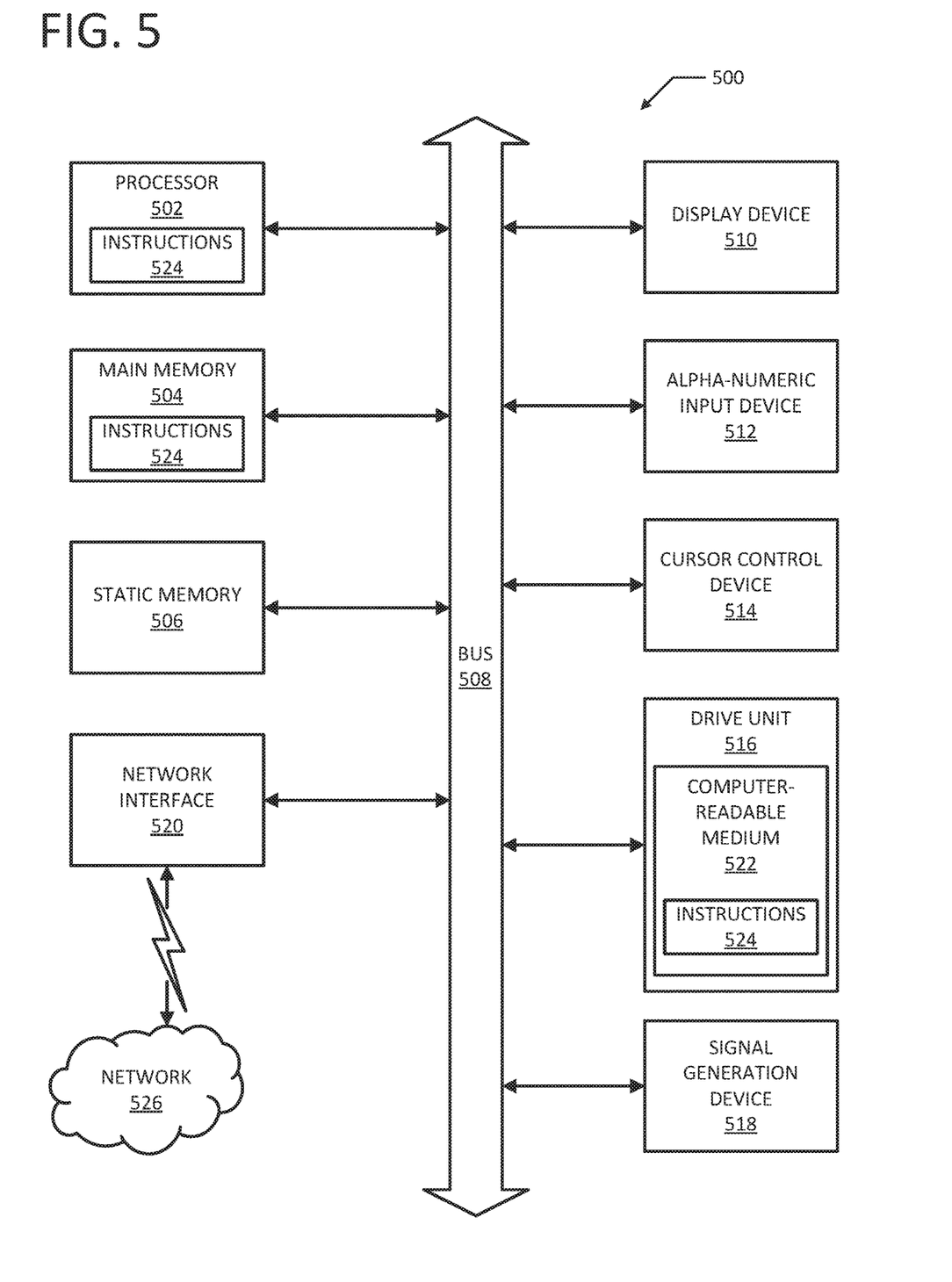
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general, non-limiting, and example description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smartphones, tablet computing devices, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With further reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504, and a static memory 506, which communicate with each other via a bus 508. In an example embodiment, the computer system 500 comprises the video controller 102. In another example embodiment, the processor 502 comprises the input processor 104 and/or the central processor 106. In yet another example embodiment, the main memory 504 and/or the static memory 506 may comprise the database 108. The computer system 500 may further include a display device 510 (e.g., a liquid crystal display (LCD), a cathode ray tube (CRT), a touchscreen display device, etc.). In example embodiments, the computer system 500 also includes one or more of an alphanumeric input device 512 (e.g., a keyboard), a user interface (UI) navigation device or cursor control device 514 (e.g., a mouse), a disk drive unit 516, a signal generation device 518 (e.g., a speaker), and a network interface device 520. The network interface device 520 may enable the computer system 500 to communicate with a communications network 526.

The communications network 526 is capable of facilitating the exchange of data among computing devices, including video controller 102, presentation device 110, and recording device 112. The communications network 526 may include a local area network (LAN) that is connectable to other telecommunications networks, including other LANs, wide area networks (WANs), and/or portions of the Internet or an intranet. The communications network 526 may also be any telecommunications network that facilitates the exchange of data, such as those that operate according to the IEEE 802.3 (e.g., Ethernet) and/or the IEEE 802.11 (e.g., Wi-Fi) protocols, for example. In other embodiments, the communications network 526 is any medium that allows data to be physically transferred through serial or parallel communication channels (e.g., copper wire, optical fiber, computer bus, wireless communication channel, etc.).

The disk drive unit 516 includes a machine-readable medium 522 on which is stored one or more sets of instructions 524 and data structures (e.g., software instructions) embodying and/or used by any one or more of the methodologies, processes, or functions described herein. The instructions 524 may also reside, completely or at least partially, within the main memory 504 or within the processor 502 during execution thereof by the computer system 500, the main memory 504, and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Figure 6A:
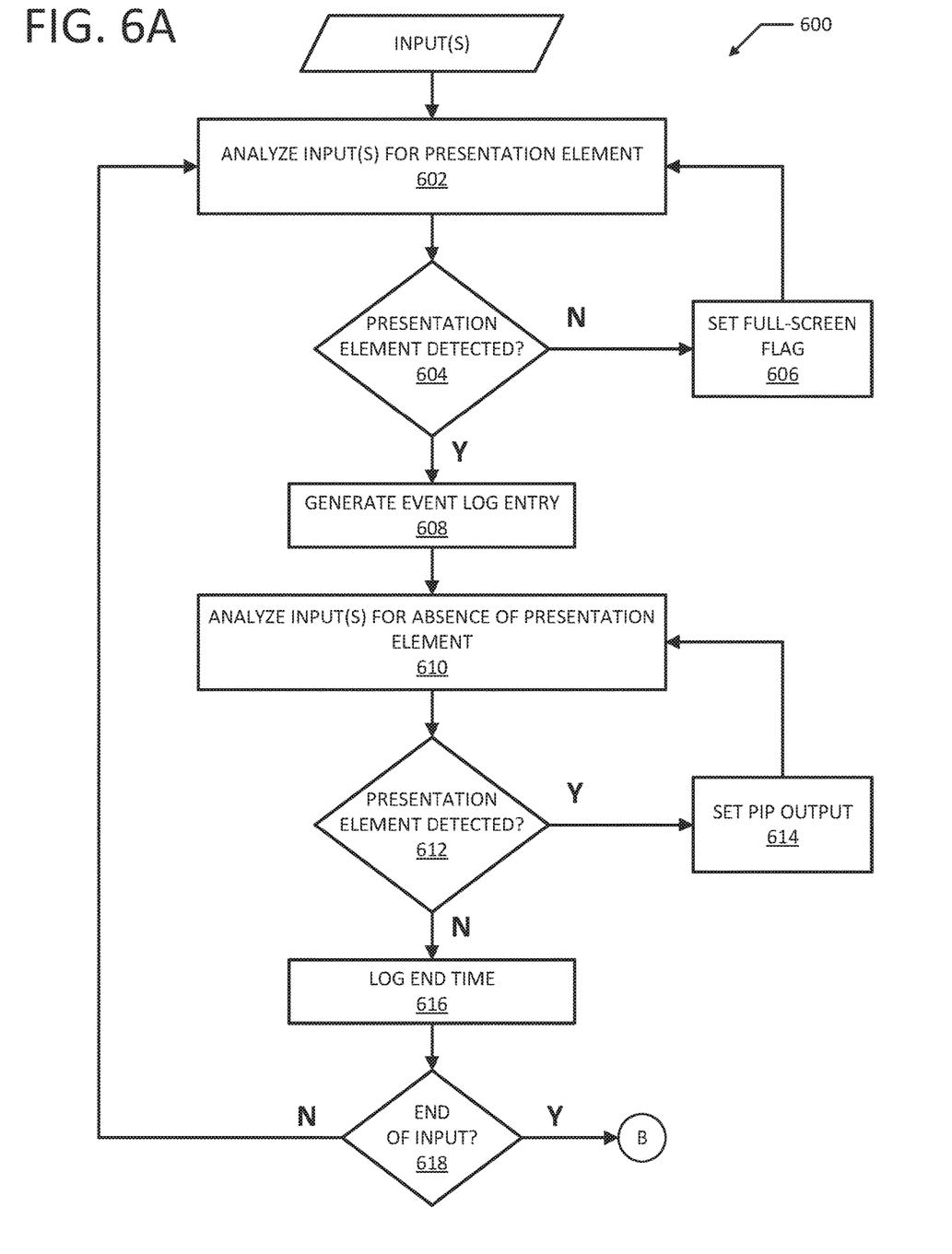
FIGS. 6A and 6B are a flowchart of another method hereof, according to an example embodiment.
Figure 6B:
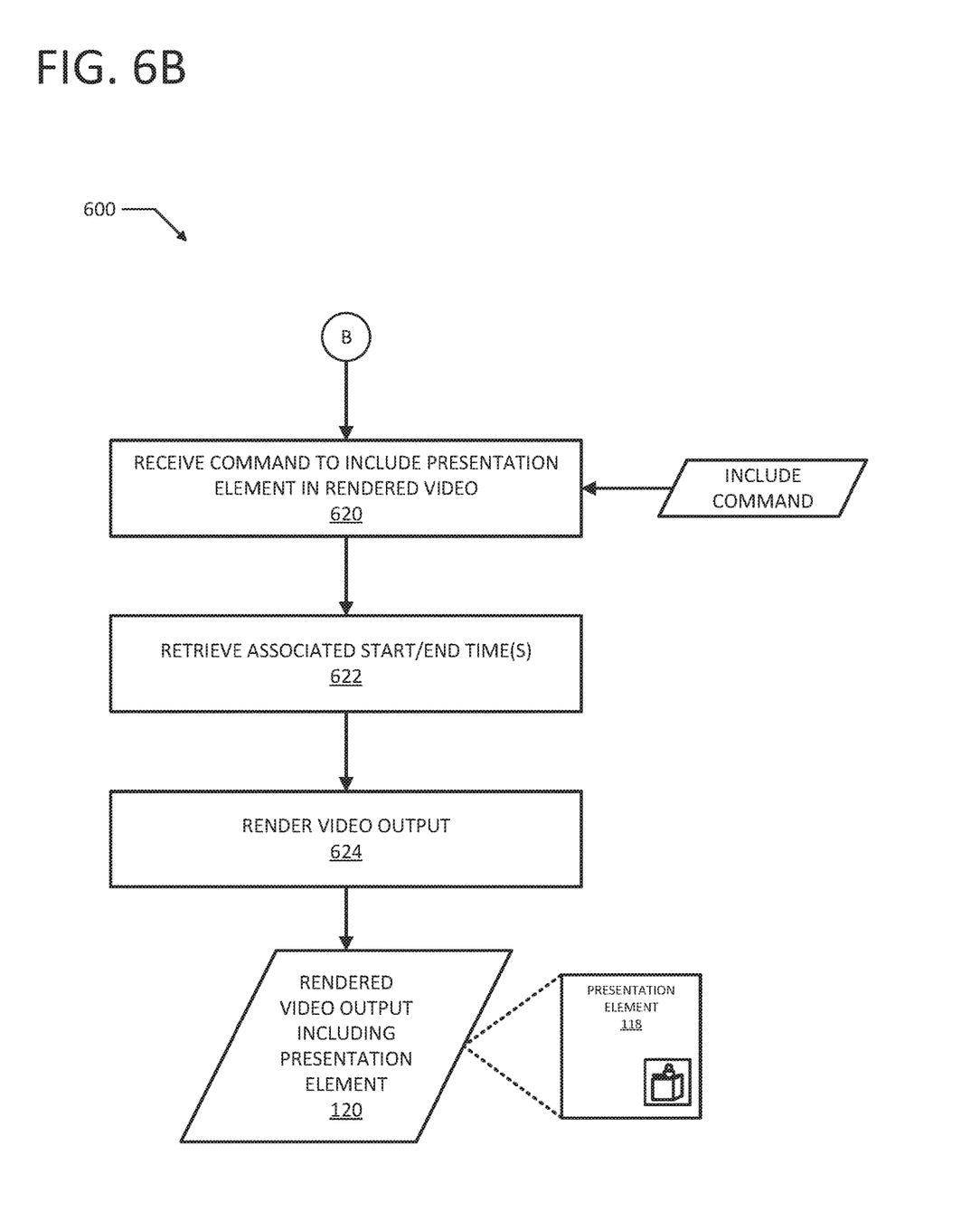

FIGS. 6A and 6B illustrate a flowchart of an example method 600 for rendering a video to add selectively included elements independently from other elements. Referring further to FIG. 6A, at 602 received input data is analyzed for the presence of the presentation element 118. As explained above, this analysis can include determining if the display of presentation device 110 is black or other specific shades and/or analyzing for cues or flags placed in the presentation element 118. In an embodiment, only presentation input 114-B may be analyzed. In an alternative embodiment, a combined data input stream that includes the presentation input 114-B and one or more other data inputs may be analyzed.

At step 604, a determination is made as to whether the presentation element 118 is detected in the input data. Upon determining that the presentation element 118 is not detected in the input data, the system 100 progresses to step 606 where the video feed from the recording device 112 is set to full screen. The system 100 then reverts to step 602.

When the system 100 determines that the presentation element 118 is detected in the input data stream, the system advances to step 608 where an event log entry for the presentation element is generated. The event log may be stored in the database 108 and include a record (e.g., a row) for each presentation element 118 detected in the input data stream. The event log may also include one or more fields (e.g., columns), including a field for an identifier of the presentation element, a field for a start time of the presentation element, and a field for an end time of the presentation element. The identifier of the presentation element may uniquely identify the presentation element from other presentation elements. For example, the identifier may be a document number and may be included in a visible or invisible manner on the presentation element 118 and detectable by central processor 106 for automatic determination of the identifier. The start time may be a timestamp, or video frame count, of the time (e.g., the elapsed time of the input data stream and/or the video feed from recording device 112, etc.) when the presentation element becomes present in the input data stream. The end time may be a timestamp, or video frame count, of the time (e.g., the elapsed time of the input data stream and/or the video feed from recording device 112, etc.) when the presentation element next becomes absent in the input data stream. In an example aspect, the presentation element records may be used to search for every incidence of a certain document element across one or more recordings. In another example aspect, the presentation element records may be cross-referenced with a transcript (e.g., transcript input 114-C) so that even a viewer of only the transcript can access the relevant presentation element, such as via a hyperlink or the like. A start time (e.g., timestamp, video frame count, etc.) for the detected presentation element 118 is logged in the event log entry for the presentation element at step 608.

At step 610, the central processor 106 analyzes received input data for the next absence of the presentation element 118. As explained above, this analysis can include determining if the display of presentation device 110 is black or other specific shades and/or analyzing for cues or flags placed in the presentation element 118. In an embodiment, the central processor 106 may analyze only presentation input 114-B. In an alternative embodiment, the central processor 106 may analyze a combined data input stream that includes the presentation input 114-B and one or more other data inputs.

At step 612, a determination is made as to whether the presentation element 118 is detected in the input data. Upon determining that the presentation element 118 is still detected in the input data, the system 100 progresses to step 614 where the video feed from the recording device 112 is set to PIP. The system 100 then reverts to step 610. When the system 100 determines at step 612 that the presentation element 118 is not detected in the input data stream, the system advances to step 616, where an end time (e.g., timestamp) for the now-absent presentation element 118 is logged in the event log entry for the presentation element. In an embodiment, an elapsed time between the start time and the end time of the presentation element 118 comprises a presentation event. A single presentation element 118 may comprise one or more presentation events that occur within the input data. In a non-limiting example embodiment, a particular presentation element 118 may be displayed on the presentation device 110 from 00:15:00 to 00:25:30 (e.g., a first presentation event of the presentation element) during testimony by the recorded subject 116 and then again from 01:40:30 to 02:05:00 (e.g., a second presentation event of the presentation element).

At step 618, a determination is made as to whether the data input has ended. Where it has not ended, the system 100 reverts to step 602. Where it has ended, the system 100 progresses to step 620.

Referring further to FIG. 6B, a command is received to include, at least in part, the presentation element 118 in the rendered video output 120. In an embodiment, the received command includes the identifier of the presentation element 118. In response to receiving the command to include, all of the start times and end times associated with the presentation element 118 are retrieved from the database 108 at step 622. Upon retrieving the start times and end times, the video output 120 is rendered, at step 624, to include the presentation element 118.

Thus, there has been shown and described systems and methods for rendering PIP video outputs and re-rendering a video to remove particular excluded elements and/or add selectively included elements independently from other elements. In a non-limiting example embodiment, the systems and methods shown and described herein streamline the use and identification of elements in a video rendering and facilitate immediate PIP combination and real-time editing of video elements based on decisions made in adjudicative proceedings. For example, if a document presented during recorded testimony is eliminated from being presented (e.g., to a jury, etc.) in trial proceedings, the systems and methods described herein eliminate that document from the output video rendering without the shortcomings of manual removal. This exclusion is retroactively performed on video renderings prior to the exclusion date, such that PIP videos are re-combined and re-rendered to eliminate the playback of excluded content during subsequent presentations of the re-rendered video.

As is evident from the foregoing description, certain aspects of the present inventions are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. All such changes, modifications, variations and other uses in applications which do not depart from the spirit and scope of the present inventions are deemed to be covered by the inventions which are limited only by the claims which follow.

What is claimed is:

1. A method of independently controlling the presence of elements in a video rendering, the method comprising:

analyzing input video data for a first presentation element signal, wherein the input video data includes a video recording of a subject, wherein the presence of the first presentation element signal indicates the presence of a first presentation element in the input video data, wherein the presence of the first presentation element in the input video data comprises a first presentation event, and wherein the first presentation element signal includes a first identifier uniquely identifying the first presentation element;

generating, in response to the presence of the first presentation element signal in the video data, a first record for the first presentation event in an event log, wherein the first record includes the first identifier uniquely identifying the first presentation element and a start time of the first presentation event in the video data;

analyzing the input video data for the absence of the first presentation element signal, wherein the absence of the first presentation element signal indicates the absence of the first presentation element from the input video data;

logging, in response to the absence of the first presentation element signal in the video data, an end time of the first presentation event in the event log record generated for the first presentation event;

analyzing the input video data for a second presentation element signal, wherein the presence of the second presentation element signal indicates the presence of a second presentation element in the input video data, wherein the presence of the second presentation element in the input video data comprises a second presentation event, and wherein the second presentation element signal includes a second identifier uniquely identifying the second presentation element;

generating, in response to the presence of the second presentation element signal in the video data, a second record for the second presentation event in the event log, wherein the second record includes the second identifier uniquely identifying the second presentation element and a start time of the second presentation event in the video data;

analyzing the input video data for the absence of the second presentation element signal, wherein the absence of the second presentation element signal indicates the absence of the second presentation element from the input video data;

logging, in response to the absence of the second presentation element signal in the video data, an end time of the second presentation event in the event log record generated for the second presentation event;

rendering a picture-in-picture (PIP) output video from the input video data, wherein the PIP output video includes a full-screen portion and an inset window portion, wherein the first presentation element comprises the full-screen portion during the first presentation event, wherein the video recording of the subject comprises the inset window portion during the first presentation event, wherein the second presentation element comprises the full-screen portion during the second presentation event, and wherein the video recording of the subject comprises the inset window portion during the second presentation event;

receiving a command to exclude the first presentation element from the PIP output video, wherein the command includes the first identifier;

retrieving, from the event log in response to said receiving the command, the start time and the end time of the first presentation event associated with the first identifier in the received command; and re-rendering the PIP output video between the retrieved start time and end time of the first presentation event to exclude the inset window portion thereof and move the video recording of the subject to the full-screen portion during the first presentation event, thereby removing the first presentation element from the PIP output video independent of the second presentation element.

2. The method of claim 1, wherein said rendering the PIP output video includes combining one or more portions of a transcript with the input video data, wherein the transcript is in synchronization with the video recording of the subject.

3. The method of claim 1, wherein the first and second presentation elements are displayed to the subject via a presentation device during the video recording of the subject.

4. The method of claim 1, wherein the video recording of the subject comprises the full-screen portion of the PIP output video before the start time and after the end time of the first and second presentation events.

5. The method of claim 1, further comprising receiving, before said rendering the PIP output video, a location of the inset window portion relative to the full-screen portion.

6. A system, comprising:
at least one central processor; and
a non-transitory computer readable storage medium having a program stored thereon, the program causing the at least one central processor to execute the steps of:
analyzing input video data for a first presentation element signal, wherein the input video data includes a video recording of a subject, wherein the presence of the first presentation element signal indicates the presence of a first presentation element in the input video data, wherein the presence of the first presentation element in the input video data comprises a first presentation event, and wherein the first presentation element signal includes a first identifier uniquely identifying the first presentation element;
generating, in response to the presence of the first presentation element signal in the video data, a first record for the first presentation event in an event log, wherein the first record includes the first identifier uniquely identifying the first presentation element and a start time of the first presentation event in the video data;
analyzing the input video data for the absence of the first presentation element signal, wherein the absence of the first presentation element signal indicates the absence of the first presentation element from the input video data;
logging, in response to the absence of the first presentation element signal in the video data, an end time of the first presentation event in the event log record generated for the first presentation event;
analyzing the input video data for a second presentation element signal, wherein the presence of the second presentation element signal indicates the presence of a second presentation element in the input video data, wherein the presence of the second presentation element in the input video data comprises a second presentation event, and wherein the second presentation element signal includes a second identifier uniquely identifying the second presentation element;
generating, in response to the presence of the second presentation element signal in the video data, a second record for the second presentation event in the event log, wherein the second record includes the second identifier uniquely identifying the second presentation element and a start time of the second presentation event in the video data;
analyzing the input video data for the absence of the second presentation element signal, wherein the absence of the second presentation element signal indicates the absence of the second presentation element from the input video data;
logging, in response to the absence of the second presentation element signal in the video data, an end time of the second presentation event in the event log record generated for the second presentation event;
rendering a picture-in-picture (PIP) output video from the input video data, wherein the PIP output video includes a full-screen portion and an inset window portion, wherein the first presentation element comprises the full-screen portion during the first presentation event, wherein the video recording of the subject comprises the inset window portion during the first presentation event, wherein the second presentation element comprises the full-screen portion during the second presentation event, and wherein the video recording of the subject comprises the inset window portion during the second presentation event;
receiving a command to exclude the first presentation element from the PIP output video, wherein the command includes the first identifier;
retrieving, from the event log in response to said receiving the command, the start time and the end time of the first presentation event associated with the first identifier in the received command; and
re-rendering the PIP output video between the retrieved start time and end time of the first presentation event to exclude the inset window portion thereof and move the video recording of the subject to the full-screen portion during the first presentation event, thereby removing the first presentation element from the PIP output video independent of the second presentation element.

7. The system of claim 6, wherein said rendering the PIP output video includes combining one or more portions of a transcript with the input video data, wherein the transcript is in synchronization with the video recording of the subject.

8. The system of claim 6, further comprising a presentation device, wherein the first and second presentation elements are displayed to the subject via a presentation device during the video recording of the subject, and wherein the presentation device is operable to generate a presentation input.

9. The system of claim 8, further comprising a recording device, wherein the recording device is operable to generate a recording input comprising the video recording of the subject.

10. The system of claim 9, further comprising an input processor, wherein the input processor is operable to combine the presentation input and the recording input for analysis by the central processor.

11. The system of claim 10, wherein the input processor is further operable to combine a transcript with the presentation input and the recording input.

12. The system of claim 6, wherein the video recording of the subject comprises the full-screen portion of the PIP output video before the start time and after the end time of the first and second presentation events.

13. The system of claim 6, wherein the program further causes the at least one central processor to execute the step of receiving, before said rendering the PIP output video, a location of the inset window portion relative to the full-screen portion.

14. The system of claim 6, further comprising a database stored on the non-transitory computer readable storage medium, wherein the event log is stored in the database.

15. A non-transitory computer readable storage medium comprising a set of instructions executable by a computer, the non-transitory computer readable storage medium comprising:
   instructions for analyzing input video data for a first presentation element signal, wherein the input video data includes a video recording of a subject, wherein the presence of the first presentation element signal indicates the presence of a first presentation element in the input video data, wherein the presence of the first presentation element in the input video data comprises a first presentation event, and wherein the first presentation element signal includes a first identifier uniquely identifying the first presentation element;
   instructions for generating, in response to the presence of the first presentation element signal in the video data, a first record for the first presentation event in an event log, wherein the first record includes the first identifier uniquely identifying the first presentation element and a start time of the first presentation event in the video data;
   instructions for analyzing the input video data for the absence of the first presentation element signal, wherein the absence of the first presentation element signal indicates the absence of the first presentation element from the input video data;
   instructions for logging, in response to the absence of the first presentation element signal in the video data, an end time of the first presentation event in the event log record generated for the first presentation event;
   instructions for analyzing the input video data for a second presentation element signal, wherein the presence of the second presentation element signal indicates the presence of a second presentation element in the input video data, wherein the presence of the second presentation element in the input video data comprises a second presentation event, and wherein the second presentation element signal includes a second identifier uniquely identifying the second presentation element;
   instructions for generating, in response to the presence of the second presentation element signal in the video data, a second record for the second presentation event in the event log, wherein the second record includes the second identifier uniquely identifying the second presentation element and a start time of the second presentation event in the video data;
   instructions for analyzing the input video data for the absence of the second presentation element signal, wherein the absence of the second presentation element signal indicates the absence of the second presentation element from the input video data;
   instructions for logging, in response to the absence of the second presentation element signal in the video data, an end time of the second presentation event in the event log record generated for the second presentation event;
   instructions for rendering a picture-in-picture (PIP) output video from the input video data, wherein the PIP output video includes a full-screen portion and an inset window portion, wherein the first presentation element comprises the full-screen portion during the first presentation event, wherein the video recording of the subject comprises the inset window portion during the first presentation event, wherein the second presentation element comprises the full-screen portion during the second presentation event, and wherein the video recording of the subject comprises the inset window portion during the second presentation event;
   instructions for receiving a command to exclude the first presentation element from the PIP output video, wherein the command includes the first identifier;
   instructions for retrieving, from the event log in response to said receiving the command, the start time and the end time of the first presentation event associated with the first identifier in the received command; and
   instructions for re-rendering the PIP output video between the retrieved start time and end time of the first presentation event to exclude the inset window portion thereof and move the video recording of the subject to the full-screen portion during the first presentation event, thereby removing the first presentation element from the PIP output video independent of the second presentation element.

16. The non-transitory computer readable storage medium of claim 15, wherein said rendering the PIP output video includes combining one or more portions of a transcript with the input video data, wherein the transcript is in synchronization with the video recording of the subject.

17. The non-transitory computer readable storage medium of claim 15, wherein the first and second presentation elements are displayed to the subject via a presentation device during the video recording of the subject.

18. The non-transitory computer readable storage medium of claim 15, wherein the video recording of the subject comprises the full-screen portion of the PIP output video before the start time and after the end time of the first and second presentation events.

19. The non-transitory computer readable storage medium of claim 15, further comprising instructions for receiving, before said rendering the PIP output video, a location of the inset window portion relative to the full-screen portion.

* * * * *

UNITED STATES PATENT AND TRADEMARK OFFICE
CERTIFICATE OF CORRECTION

PATENT NO. : 10,791,298 B2  
APPLICATION NO. : 16/109253  
DATED : September 29, 2020  
INVENTOR(S) : Jay Rutler Page 1 of 1

It is certified that error appears in the above-identified patent and that said Letters Patent is hereby corrected as shown below:

In the Specification

In Column 7, Line 3, delete "reactions" and replace with -- redactions --

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*